March 15, 1966 D. B. JAMES ETAL 3,241,067
SYNCHRONIZATION OF DECODER SYSTEMS BASED
ON MESSAGE WAVE STATISTICS
Filed April 21, 1961 7 Sheets-Sheet 1

INVENTORS D. B. JAMES
F. W. MOUNTS
BY Harry C. Hart
ATTORNEY

INVENTORS D. B. JAMES
F. W. MOUNTS
BY
Harry C. Hart
ATTORNEY

INVENTORS D. B. JAMES
F. W. MOUNTS
BY Harry C. Hart
ATTORNEY

INVENTORS D. B. JAMES
F. W. MOUNTS
BY Harry C. Hart
ATTORNEY

INVENTORS D. B. JAMES
F. W. MOUNTS
BY Harry C. Hart
ATTORNEY

March 15, 1966 D. B. JAMES ETAL 3,241,067

SYNCHRONIZATION OF DECODER SYSTEMS BASED ON MESSAGE WAVE STATISTICS

Filed April 21, 1961 7 Sheets-Sheet 6

INVENTORS D. B. JAMES
F. W. MOUNTS

BY Harry C. Hart

ATTORNEY

March 15, 1966 D. B. JAMES ETAL 3,241,067

SYNCHRONIZATION OF DECODER SYSTEMS BASED ON MESSAGE WAVE STATISTICS

Filed April 21, 1961 7 Sheets-Sheet 7

INVENTORS D. B. JAMES
F. W. MOUNTS

BY Harry C. Hart

ATTORNEY

United States Patent Office 3,241,067
Patented Mar. 15, 1966

3,241,067

SYNCHRONIZATION OF DECODER SYSTEMS BASED ON MESSAGE WAVE STATISTICS

Dennis B. James, Bernardsville, and Frank W. Mounts, Murray Hill, N.J., assignors to Bell Telephone Laboratories, Incorporated, New York, N.Y., a corporation of New York Filed Apr. 21, 1961, Ser. No. 104,609
16 Claims. (Cl. 325—41)

This invention relates to the decoding of encoded message waves and, more particularly, to the identification of the constituent code words of such message waves.

A word is the smallest portion of a message wave with an independent significance. In code form, the word is an assemblage of characters obtained, for example, from a train of code signals that are spaced from each other on a time scale. Such signals are derivable at a transmitter station by taking samples of a preassigned parameter from a word length of a wave in analog form, or, by designating the samples as words and translating them into subordinate constituents. Typically, a code word is a group of two-valued elements with a distinctive permutation. Then each position or "notch" of the word is occupied by a binary integer called a bit, which admits of only two recognizably different conditions variously designated as dot and dash, mark and space, or, more generally, *a* and *b*.

To be separately identifiable, code words are often spaced from each other, but this is undesirable where spaces represent code elements, as in the mark-space binary code. Furthermore, the use of spaces for word separation reduces the capacity of a communications channel interconnecting transmitter and receiver stations. To a limited extent these difficulties have been surmounted by the use of an identifying signal, often designated a framing signal, at either the termination or the commencement of each code word. This allows the transmitter and receiver operations to be phased or synchronized with each other. But the use of an identifying signal to achieve phasing or synchronization also reduces channel capacity, albeit slightly, and makes for increased complexity in coding, transmission and decoding.

Accordingly, it is an object of the invention to accomplish the identification of code words without the need for identifying signals. A related object is to realize the self-synchronization or self-phasing of a receiver system that decodes an encoded message wave.

While the content of the encoded message wave is unknown beforehand, certain of its characteristics are readily available, such as the kind of message and the kind of code. The latter must be known before decoding can occur. Additionally, the presence of certain recurrent patterns gives an indication as to the nature of the coded information. It is a yet further object of the invention to make use of message characteristics in accomplishing the self-synchronization of various decoder systems.

To simplify the handling of coded messages, it is desirable to use codes that permit the transfer of an appreciable amount of information with a small number of code elements per word. An advantageous way of doing this is by differential encoding, in which each code word contains the incremental change in information over that given by the totality of all prior words. The inherent advantages of such encoding would be further enhanced were framing signals dispensible. Consequently, it is a still further object of the invention to eliminate the need for framing signals in conjunction with differential encoding. An associated object is to render differential decoding systems self-phasing.

The invention accomplishes the above and related objects by comparing, during decoding, the statistics of words reconstituted from code signals with the statistics that normally prevail when code words are correctly reconstituted.

In reconstituting the words, the code signals are selectively grouped according to the number of characters per word generated by the encoding. An error is indicated when the reconstituted words, while still encoded or after decoding, do not conform to a prescribed standard.

The standard may be established in a variety of ways. It may be taken with reference to a code word that is excluded from the list of legitimate code words. Thus, a grouping of code signals that produces an illegitimate code word is indicative of error. The signals are then regrouped and re-examined, and the process is continued until the statistics of the reconstituted code words indicate the absence of error. In this way the correct phase relation is established between the code words dispatched from the transmitter and those reconstituted at a receiver. Such decoder system is said to be self-synchronized, in general, and self-framed, in particular.

While the invention provides for error recognition, it also avoids premature regrouping. An occasional error, attributable to faults in decoding, or in transmission, rather than in the identification of code words, should not command regrouping. Hence, it is a feature of the invention that corrective action does not take place until the rate at which a prescribed standard is exceeded rises above a prescribed threshold.

Another indicator of error, of the many indicators cognizable by the invention, is given when the words, as reconstituted in signal form before or after decoding, exceed either an upper or a lower bound. This indicator may be used singly, or in conjunction with others.

An advantageous employment of the bound limitation indicator alone is had with pulse code modulation, in general, and differential pulse code modulation, in particular. In the latter case a decoded message is formed by the continuous summation of decoded words. According to one aspect of the invention, when the instantaneous summation of differentially encoded words exceeds, with a high degree of recurrence, the maximum amplitude level of the originally encoded message, a regrouping, i.e., a reframing, of the code signals is indicated. Such a bound limitation system is said to be self-framed because it ultimately accomplishes positive identification of the code words being decoded.

An insight into the bound limitation aspect of the invention may be obtained by considering the general case of differential encoding where the code signals are misgrouped by a single code, or notch, position.

One form of differential encoding begins with a quantized analog message wave ranging in amplitude from zero to $N_n'$ units where $N_n'=2^{k'}-1$, and $k'$ is an integer, and having a general level $N'$. Then the number of derived discrete differential word levels, i.e., quantized increments of the wave, ranges from $-N_n$ to $+N_n$, including zero, with a general word level given by N. When encoded, these word levels or quantized increments require $$k'+1=k$$

binary digits. For the natural binary code the relationships between word levels and their corresponding code words are given by Table I.

*Table I*

| Word Level | Code Word | Error Code Word |
|---|---|---|
| $+N_n$ | 11 ..... 11 | p 11 .......... 11 |
| . | . | |
| . | . | |
| N | . | |
| . | . | |
| . | . | |
| 0 | 10 ..... 00 | p 10 .......... 00 |
| . | . | |
| . | . | |
| $-N$ | . | |
| . | . | |
| . | . | |
| $-N_n$ | 00 ..... 01 | p 00 .......... 00 |
| $-(N_n+1)$ | 00 ..... 00 | p 00 .......... 00 |

Included at the bottom of Table I is the word level $-(N_n+1)$, which, while not generated in the general encoding, may be present when the code signals are incorrectly grouped. If the code words are reconstituted by grouping $k-1$ digits of each word with the last digit of the word which precedes it, the resultant error code words take the form shown in the third column of the table. They have a prefix digit $p$, which is zero or one, depending upon whether the preceding word is odd or even.

The general error word level E resulting from the decoding of misgrouped digits is given by the relation:

$$E=\frac{N\pm(N_n+1)}{2} \qquad (1)$$

where $(N_n+1)$ is added if the preceding word is odd and subtracted if the preceding word is even. Nonintegral values in Equation 1 are rounded to the next lower integer. The summation of consecutive error code word becomes:

$$\sum_{N \text{ is odd}}\left(\frac{N+N_n+1}{2}\right)+\sum_{N \text{ is even}}\left(\frac{N-N_n+1}{2}\right)$$
$$=\sum_{N \text{ is integral}}\left(\frac{N}{2}\right)+\left(\frac{N_n+1}{2}\right)(o-e) \qquad (2)$$

where $o$ and $e$, respectively, indicate the number of even and odd words. Since for differential pulse code modulation, the summation, i.e., the first term on the right-hand side of Equation 2 is bounded in the range $-N_n/2$ to $+N_n/2$ then if $$|o-e|\geqslant 3 \qquad (3)$$

The entire right-hand side of Equation 2 will always lie either beyond the upper bound $+N_n$ or beyond the lower bound $-N_n$. On the basis of the probability distribution of odd and even words it is apparent that the condition of Equation 3 will be satisfied for a small number of error code words.

The foregoing demonstration has been confined to single position misgrouping of words that are differentially encoded with respect to standard scale quantization. A similar demonstration applies to pulse code modulation generally, regardless of the number of code position errors. When differential encoding uses tapered scale quantization, the error condition is encountered with greater rapidity.

Other features of the invention will become apparent after the consideration of several illustrative embodiments taken in conjunction with the drawings in which.

Figure 1:
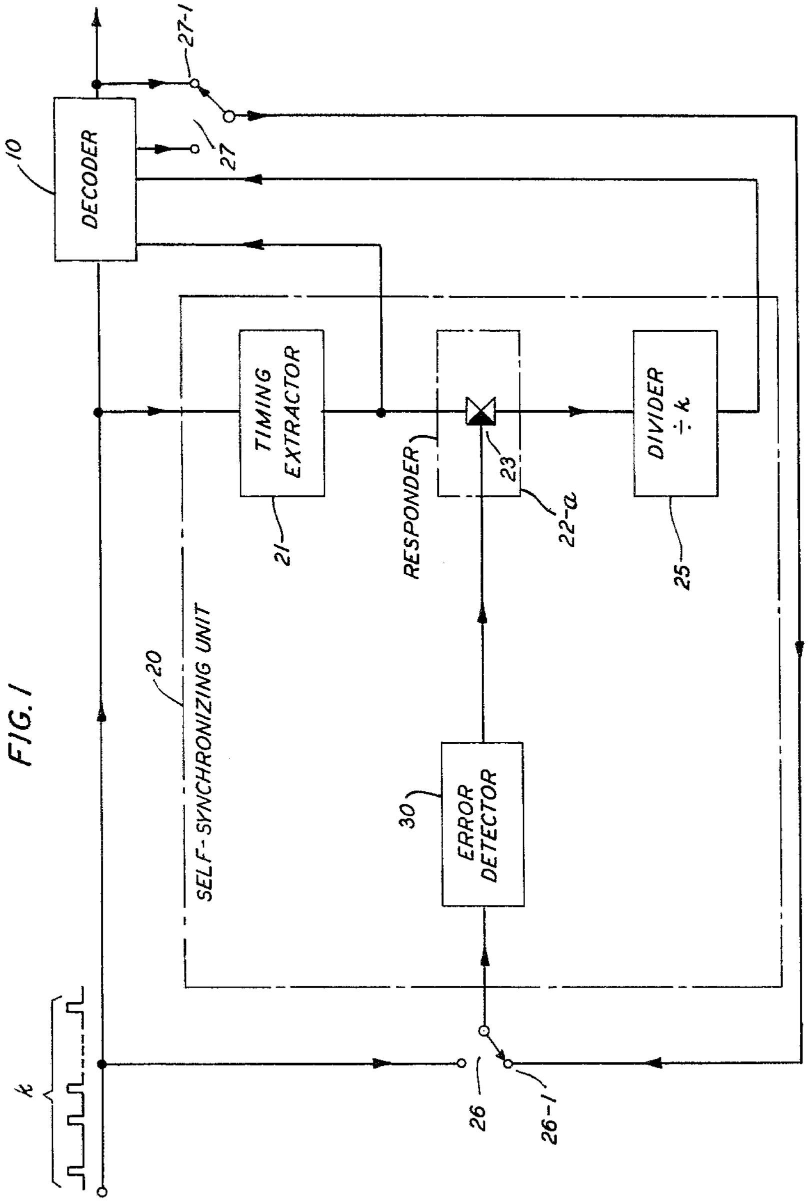
FIG. 1 is a block diagram of a self-synchronizing or self-phasing decoder system.

Turn now to the self-synchronizing or self-phasing decoder system of FIG. 1, to which an incoming train of code signals is applied. Each group of the signals occupying $k$ code or notch positions per word are applied to a decoder 10, whose nature depends upon the kind of encoding to which the original message wave was subjected. Ordinarily, such a decoder 10 would be accompanied by a synchronizing or phasing unit to direct the translation of each code word into its analog counterpart at intervals that are phased with respect to the code word source through the use of identifying or synchronizing signals. Since code signals processed according to the invention do not contain synchronizing signals, the decoder of FIG. 1 is instead accompanied by a self-synchronizing or self-phasing unit 20.

With self-synchronization, a timing extractor 21, advantageously a conventional crystal-tuned amplifier, is used to derive marker signals that identify each position or notch of the code words. These marker signals pass through a responder **22–*a* into a divider 25**.

For each $k$ marker signal there is applied to the decoder 10 a control signal that indicates to the decoder 10 that the preceding group of $k$ code signals is to be translated into analog form. Evidently the analog output of the decoder 10 will be in error if the code signals are misgrouped.

An error condition is established by processing, in a detector 30, message constituents derived from the decoder 10 or from the incoming code signals, depending upon the setting of a first selector switch 26. As shown in FIG. 1, the selector switch is set in its first position 26–1 to provide the self-synchronizing unit 20 with signals obtained at a terminal output of the decoder 10 through a second selector switch 27 set in its first position 27–1. Alternate setting of the second selector switch 27 taps an intermediate output of the decoder 10. In any event, the detector 30 responds to an illegitimate code word or to some other condition indicating that the decoder 10 is out of synchronization. Detection of an error condition causes the responder **22–*a* to alter the position marker signals applied to the divider 25**.

One form of responder **22–*a* employs a switch 23, whose normally closed contacts are forced apart to interrupt the marker-signals. For each interruption at the responder 22–*a*, enduring beyond the interval between timing signals, the divider control signal is delayed by one code position, i.e., is caused to slip one notch, and thus modify the decoder output, which, in turn, supplies the error detector 30 with altered message constituents. As long as the decoder 10 remains out of synchronism, i.e., out of phase with the source of its code words, the error detector 30 sucessively operates the responder 22**–*a* and causes the divider 25 to slip one notch for each activation.

Figure 2:
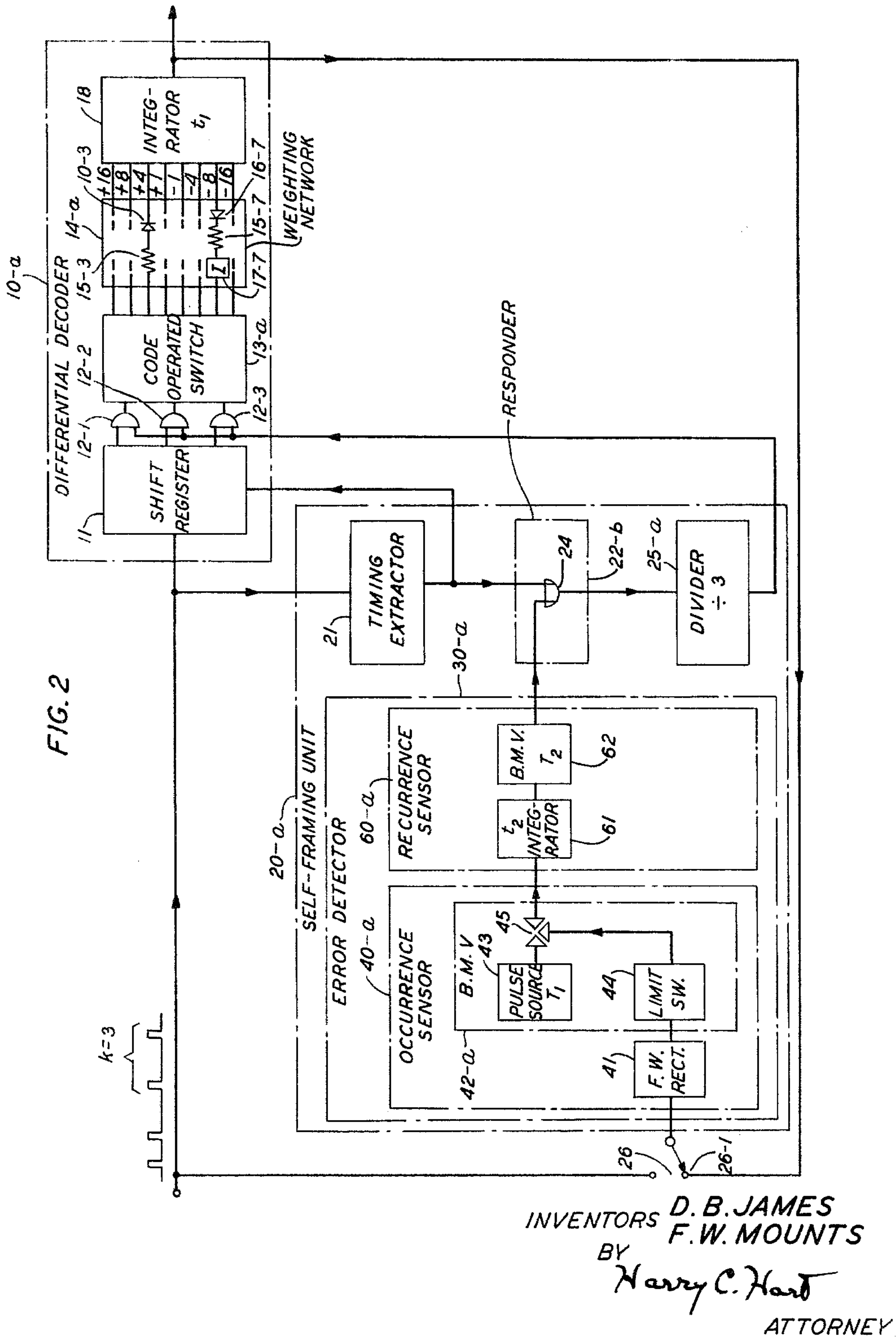
FIG. 2 is a block diagram of a self-framing decoder system adapted to respond to bounded signals.

To illustrate the self-synchronization for bounded signals, the system of FIG. 1 is adapted as the self-framing system of FIG. 2 for three-bit differential pulse code modulation.

An advantageous differential code is of the expanded-scale variety using conventional binary digits as indicated in Table II:

*Table II*

| Differential Word Level | Code Word |
|---|---|
| +16 | 111 |
| +8 | 110 |
| +4 | 101 |
| +1 | 100 |
| −1 | 011 |
| −4 | 010 |
| −8 | 001 |
| −16 | 000 |

The quantized increments or differential word levels range from −16 to +16 in powers of 2, except for the first. It is to be understood that the invention applies equally with other kinds of coding.

In the differential decoder 10–*a* of FIG. 2 incoming bits (binary digits) enter a shift register 11, whose shifting signals are supplied by the timing extractor 21 of a self-framing unit 20*a*. For every third-bit position the register AND gates 12–1 through 12–3 are operated by a control signal from a divider 25–*a*, allowing each word group of three-bits to enter a code-operated switch 13–*a*. A typical switch, which converts 3 binary inputs into a signal on one out of eight outputs, is the kind discussed in Section 13–15 of "Pulse and Digital Circuits," by Milman and Taub (McGraw-Hill).

Beyond the code-operated switch a weighting network 14–*a* produces individual differential word levels, in accordance with Table II, corresponding to the various code words. This is accomplished by adjusting the resistive magnitudes of diode-isolated, weighting resistors 15, of which two resistors 15–2 and 15–7 are shown in the inverse ratios of 16:8:4:1:1:4:8:16. Since differential encoding produces negative, as well as positive increments, the isolating diodes 16 are poled accordingly and half of the resistors 15 are accompanied by standard inverters 17. A summation of the weighted outputs by an integrator 18 re-establishes the message wave originally encoded, when the code signals are correctly grouped.

Regardless of the groupings, the reconstituted wave is applied, through a selector switch 26 set in its first position 26–1, to the error detector 30–*a* of a self-framing unit 20–*a*. The detector combines an occurrence sensor 40–*a* with a recurrence sensor 60–*a*.

In the occurrence sensor 40–*a*, a full wave rectifier 41 allows the use of a unidirectional bound indicator whether the exceeded bound is positive or negative.

The bound indicator is, in effect, a biased multivibrator 42–*a*. It contains a pulse source 43 that is controlled by a limit switch 44. When the cut-off level of the limit switch 44 is exceeded, the normally opened contacts of a sensor switch 45 are allowed to close and remain closed as long as the cut-off level is exceeded. This allows the pulse source 43 to apply a succession of pulse signals to the recurrence sensor 60–*a*. In other words, pulse signals are generated as long as the "bias" of the limit switch 44 is exceeded. Hence, the designation "biased multivibrator."

At the recurrence sensor 60–*a* an integrator 61 accumulates outputs from the occurrence sensor 40 until the threshold of a second biased multivibrator 62, like the first, is exceeded causing the activation of the responder 22–*b*.

In FIG. 2 the responder 22–*b* takes the form of an OR gate 24, whose inputs are derived respectively from the timing extractor 21 and the second biased multivibrator 62. If the time spacings of the recurrence sensor signals differ from those of the code signals, they become inserted between the usual marker signals produced by the extractor 21. For each inserted signal the divider 25–*a* operates one position, or notch, early and thus allows the incoming code signals to be regrouped.

To demonstrate the self-framing principal, assume that the code words applied to the differential decoder 10–*a* of FIG. 2 have been derived from an analog wave with a maximum amplitude of nine units. Assume further that the analog wave has been sampled at the rate prescribed by the sampling theorem and that each of the samples is a word to be differentially encoded. For generality, the successive sample amplitudes are taken from a table of random numbers.

Figure 3A:
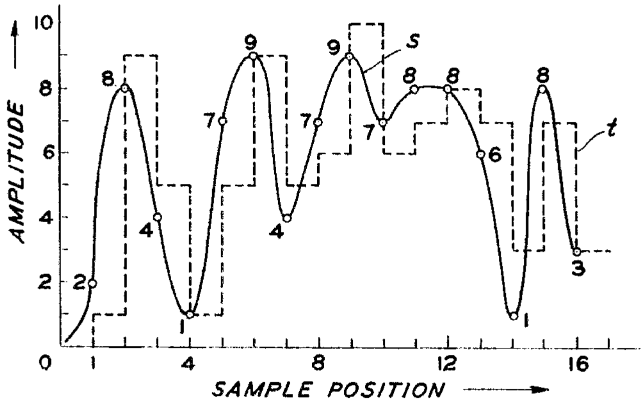
FIGS. 3A through 3C are waveform diagrams explanatory of self-framing in the system of FIG. 2.

However, other sample amplitudes would serve equally well. A waveform *s* enveloping several random samples is shown in FIG. 3A, with the sample positions marked along the axis of abscissas and the wave amplitudes indicated along the axis of ordinates. The numeral in the vicinity of each sample indicates its amplitude. Since the differential decoder system of FIG. 2 employs a tapered scale, the quantization levels used with the samples are obtained from Table II. The resulting quantized increments, from each of the samples of FIG. 3A to the next, are given by dashed line markers in FIG. 3B. When translated, the quantization levels become successive three-digit code words given in the first column of Table III.

*Table III*

| Code Word | First Apparent Code Word | Second Apparent Code Word |
|---|---|---|
| 100 | | |
| | 001 | 011 |
| 110 | | |
| | 100 | 001 |
| 010 | | |
| | 100 | 001 |
| 010 | | |
| | 101 | 010 |
| 101 | | |
| | 011 | 110 |
| 101 | | |
| | 010 | 101 |
| 010 | | |
| | 101 | 010 |
| 100 | | |
| | 001 | 010 |
| 101 | | |
| | 010 | 101 |
| 010 | | |
| | 101 | 010 |
| 100 | | |
| | 001 | 010 |
| 100 | | |
| | 000 | 001 |
| 011 | | |
| | 110 | 101 |
| 010 | | |
| | 101 | 010 |
| 101 | | |
| | 010 | 101 |
| 010 | | |

Ideally the decoding and summation of the successive words produce the dashed-line staircase waveform *t* of FIG. 3A shown with the original waveform *s* for comparison. Since a wave with a maximum amplitude of nine units will require maximum quantization levels of ± 8 units, the bounds of the reconstituted signal can vary between +9 units and −9 units, depending upon the location of the steady signal level in the reconstituted wave.

When the code signals derived from the samples of FIG. 3A are misgrouped by one code position, they produce the apparent code words shown in the second column of Table III. On being translated, the error code words yield quantization levels given by solid-line markers in FIG. 3B. These levels are summed to produce the resulting solid-line waveform $x$ of FIG. 3C, which is seen to exceed the lower bound of nine units, after the occurrence of eight words. If the code words are misgrouped by two positions, the resultant permutations of their bits are as indicated in the third column of Table III and their reconstituted message wave is as indicated by the dashed-line waveform $y$ in FIG. 3C where the lower bound of nine units is exceeded after two words. Of course, the decoder may be inoperative during the initial portion of the transmission. This has the effect of altering the steady signal level of the reconstituted message wave. For example, if decoding does not commence until the seventh word and, if the words are misgrouped by one-bit position, the resulting reconstituted message wave follows the dotted-line pattern $z$ of FIG. 3C, for which an error indication is given after the occurrence of but four words. The dotted-line pattern is formed by disregarding the first six solid-line increments in FIG. 3B and adding the remainder of the increments, commencing with the seventh.

Figure 3B:
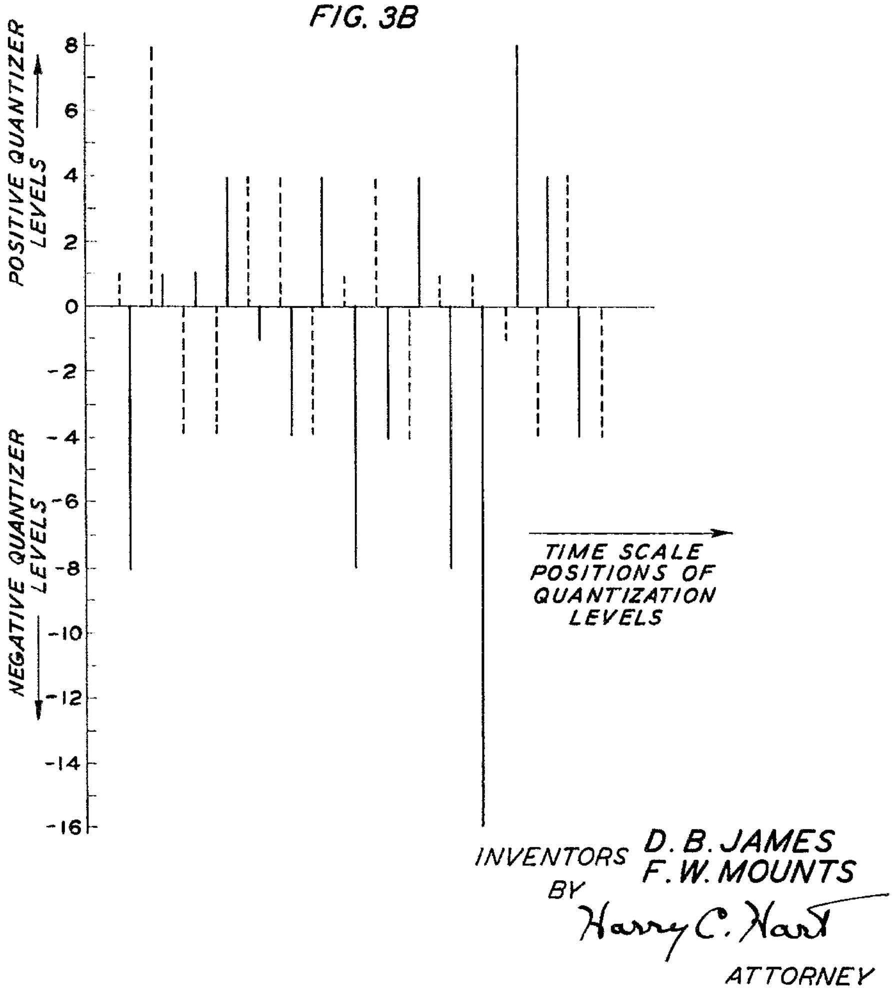
Figure 3C:
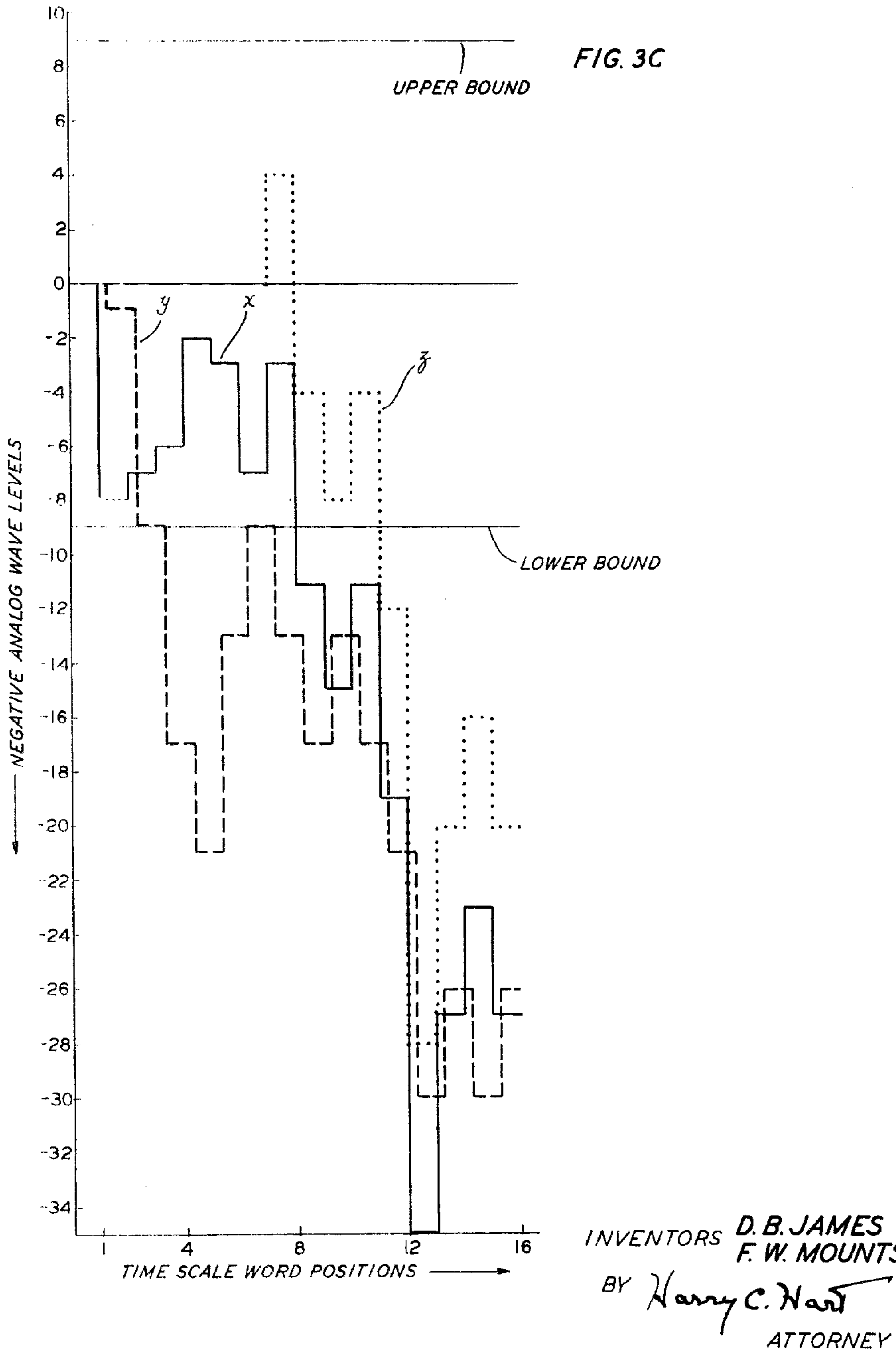

The examples considered in conjunction with the waveforms of FIGS. 3A through 3C have assumed an ideal integrator 18 in the decoder **10–*a* of FIG. 2 and have neglected the effect of an occasional error on the detection process. Since such an error may cause the cut-off level of the limit switch to be exceeded, there is a possibility that a substantially ideal decoder integrator 18 will thereafter continue to produce an output signal which exceeds the upper or lower bound of the detector 30–*a*. As noted earlier, it is the frequent recurrence of the bound-exceeded condition that should activate the responder 22–*b*. To prevent a cumulative error response starting with an occasional error, the integrator 61 in the sensor 60 may be adjusted to have a short time constant $t_2$, so that only extreme recurrence rates will build up a sufficient accumulation of occurrence sensor outputs on the integrator 61 and activate the second biased multivibrator 62. Since the multivibrator 62** should itself operate infrequently, its pulse duration interval $T_2$ is desirably selected according to the relation:

$$T_2 > t_2 \qquad (4)$$

The fact that, in practice, the decoder integrator 18 is not ideal and has a time constant $t_1$ may be taken into account in the selection of the pulse rate interval $T_1$ for the pulse source 43 of the first biased multivibrator **42–*a*** according to the relation:

$$T_1 > t_1 \qquad (5)$$

When satisfied, Equation 5 allows an occasional error signal to partly decay at the integrator 18 before the occurrence of a second pulse signal from the pulse source 43.

It is also noteworthy that the examples, illustrated by FIGS. 3A through 3C have considered a small number of code signals. In practice the number of code signals generated is quite large, even for short time intervals. Under those circumstances, significant divergences between the recurrence rates of occasional error signals and those of error signals attributable to the misgrouping of code words have been obtained for various message waves and boundary conditions.

A typical example is provided by a video wave, limited in peak-to-jeak amplitude, that is sampled at a rate of approximately one-half megacycle and encoded into a maximum of 64 quantized levels. When the coding is according to Table II, four sample intervals are needed to encode a maximum incremental change of 64 units.

For occasional errors in the decoding of the video wave with correctly grouped code signals, as many as one thousand pulse signals per second have been detected at the recurrence integrator 61. However, for code signals misgrouped by one position, the pulse rate at the integrator 61 has increased to a minimum sixty thousand per second. A comparable increase applies for a two-position misgrouping. The maximum time required to self-frame the decoder system was found to be about 0.003 second.

Similar results have been obtained with fixed frequency sinusoidal waves. With certain fixed frequencies and amplitudes, the self-framing time may become appreciable, even infinite in extreme cases. Nevertheless, these cases, involving as they do codes or waves with a trivial information content, are of minor significance.

The differential decoder system of FIG. 2 is organized to indicate an error condition on the basis of bound limitations alone. Usually, other characteristics of the encoded message are known as well. Video scenes contain numerous "flats," i.e., intervals of uniform signal level. In voiced waves, similar flats are presented by the electrical counterparts of pauses. On the basis of such knowledge the system of FIG. 2 may be considerably simplified.

Figure 4:
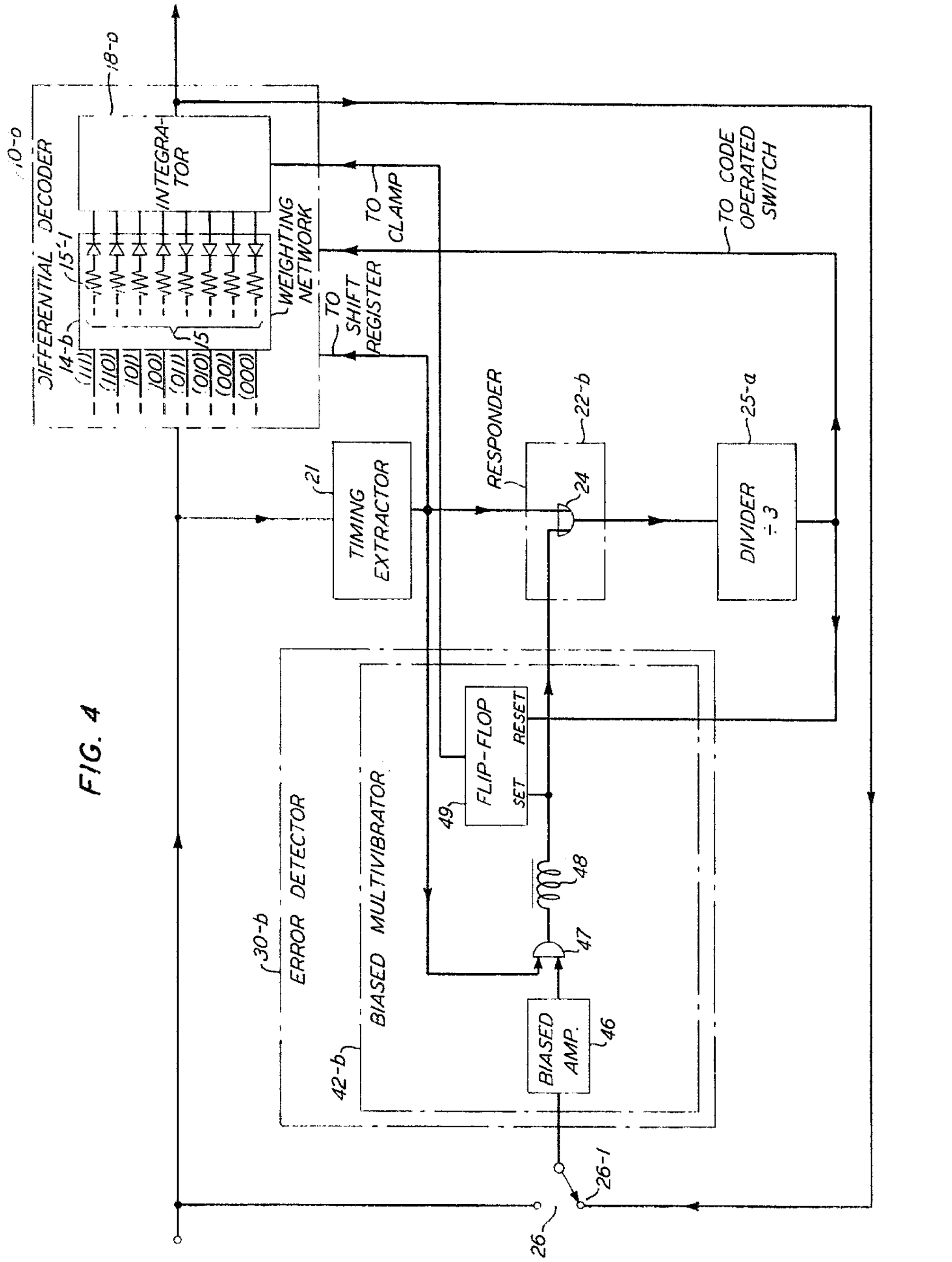
FIG. 4 is a block diagram of a self-framing decoder system, whose self-framing behavior is accentuated by the use of special coding.

In the simplified differential decoder system of FIG. 4 the error detector **30–*b* is an occurrence sensor taking the form of biased multivibrator 42–*b* alone. All other components are similar to those in FIG. 2. The bound level of the detector 30–*b* is determined by the setting of a biased amplifier 46. Once this level is exceeded, the biased amplifier 46 applies a signal to an AND gate 47, enabling the marker signals from the timing extractor 21 to enter a delay unit 48. After a half-bit interval, a delayed marker signal sets a flip flop 49, whose output clamps the integrator 18–*b* and restored it to an appropriate steady level. This clamping action corresponds to the adjustment of the integrator time constant with respect to the interval between successive pulses in the first biased multivibrator 42–*a* of FIG. 2. The delayed marker signal also enters the responder 22–*b*, where it passes through an OR gate 24 and is inserted between the marker signals supplied by the timing extractor 21. As described in conjunction with FIG. 2, the divider 25–*a* then causes the decoder 10–*b* to slip a notch. The divider signal also resets the multivibrator flip flop 49, so that, if the first regrouping action does not restore the decoder output to normalcy, the biased multivibrator 42–*b*** is able to resume its cycle of operation.

When the decoder of FIG. 4 is employed with a special code, misframing during a flat creates an error condition that rapidly exceeds a permissible bound. An appropriate code for the decoder system of FIG. 4 is given in Table IV:

*Table IV*

| Differential Word Level | Code Word |
|---|---|
| +16 | 111 |
| +8 | 110 |
| +4 | 101 |
| +1 | 100 |
| −1 | 000 |
| −4 | 001 |
| −8 | 010 |
| −16 | 011 |

The code words of Table IV have been formed from those of Table II by inverting the order of the code words for negative word levels.

Consequently, the levels corresponding to a flat, namely +1 and −1 produce successive pairs of the code words 1 0 0, 0 0 0. If these code words are misgrouped by a single bit position, they become 0 0 0, 0 0 1, and are translated into the successive levels −1 and —4. If the code words are misgrouped by two positions, they become 0 0 0, 0 1 0, and are translated into —1 and —8. It is evident that a small number of occurrences of such misgrouped words will rapidly exceed the bound level of the originally encoded analog wave.

In Table IV it is seen that, aside from the first bit, which is associated with the sign of the level (+ is 1 and — is 0), the code words for positive and negative signal levels are alike. This principle may be used to construct any appropriate symmetrical code, namely one having, about its zero word level, odd symmetry for its sign bit and even symmetry elsewhere. In Table V, by way of illustration, the code cords corresponding to +16 and —16 in Table IV have been assigned to the word levels +1 and —1. Other changes that preserve coding symmetry are made accordingly.

*Table V*

| Differential Word Level | Code Word |
|---|---|
| +16 | 110 |
| +8 | 101 |
| +4 | 100 |
| +1 | 111 |
| —1 | 011 |
| —4 | 000 |
| —8 | 001 |
| —16 | 010 |

Then if the code words of Table V, corresponding to flats, are misgrouped, they are translated into successive levels of +16 and +1 or +8 and +1, depending upon whether the misgrouping is for one or two bit positions.

To accommodate symmetrical codes, such as those of Tables IV and V, only minor changes are needed in the decoder 10–*b* of FIG. 4. With switch signals derived from the various code permutations shown at the several inputs of the weighting network 14–*b* in FIG. 4, the symmetry condition on the code is satisfied when the weightings of corresponding resistors 15′ in the top and bottom groups are identical. For a symmetrical code, according to Table IV, the inverse weighting ratios for successive resistors, starting with the uppermost resistor 15′–1 are 16:8:4:1:16:8:4:1. If Table V is followed, the inverse ratios become 1:16:8:4:1:16:8:4.

The decoder systems considered thus far have obtained their self-framing signals with respect to the analog output of the decoder 10. However, in keeping with the invention, the self-framing unit 20 may be made to operate more immediately from the code signals.

Figure 5:
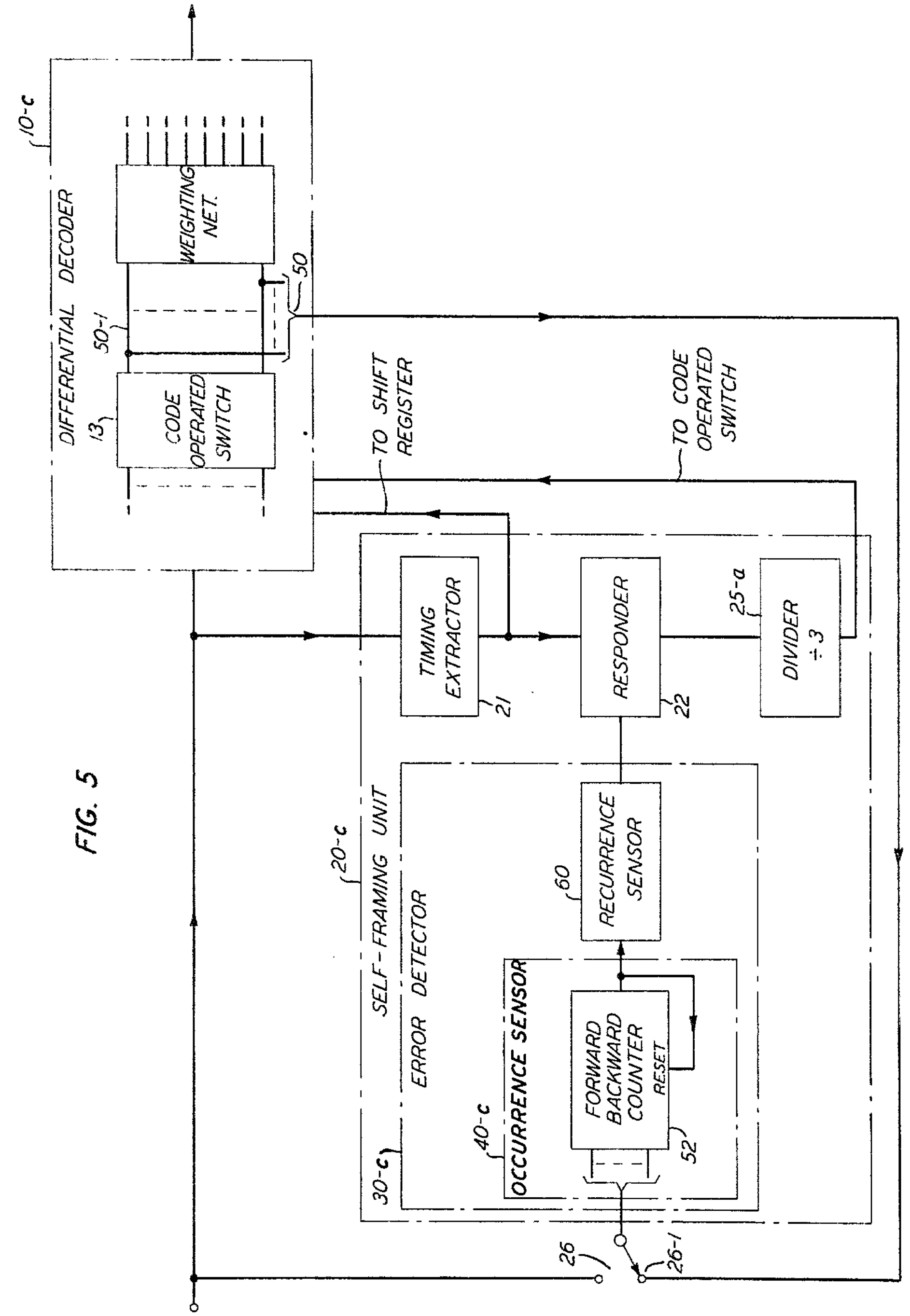
FIG. 5 is a block diagram of a self-framing decoder system whose self-framing unit responds to code signals, rather than their analog counterparts.

In the arrangement of FIG. 5 the basic components of the decoder are as shown in FIG. 2, with modifications both at the decoder 10–*c* proper and in the occurrence sensor 40–*c* to account for the code signal operation of the self-framing unit 20–*c*. Consequently, the signal path from the decoder 10–*c* to the self-framing unit 20–*c* extends at the decoder, from the code operated switch 13, instead of from the integrator output, and takes the form of a bundle 50 of conductors. At the error detector 30–*c* the occurrence sensor 40–*c* is desirably a forward-backward counter 52 of conventional variety. The conductors of the self-framing bundle 50 are connected to the counter 52 in accordance with the code conversion effectuated at the code operated switch 13. Thus, the uppermost output terminal 50–1 of the switch 13, which presents a switch signal for a word grouping corresponding to an analog magnitude of +16 units, is connected to the counter 52 to cause it to register an additional 16 units for the occurrence of switch signal on that terminal 50–1.

When the maximum incoming signal level is 64 units, a count that departs from zero in either direction by more than 64 units indicates that a bound has been exceeded. For convenience the counter 52 can be set to register a count of 128 when it is in equilibrium. Then the counter 52 is set to furnish an output to the recurrence sensor 60 when its count exceeds a maximum of 192 or falls below a minimum of 64. For each such occurrence the counter 52 is reset to its equilibrium count of 128. The recurrence sensor 60 operates as described previously.

Being operative with discrete signal levels, the arrangement of FIG. 5 has the advantage of providing a more positive reaction to the existence of an error condition than obtains with analog signals.

Figure 6:
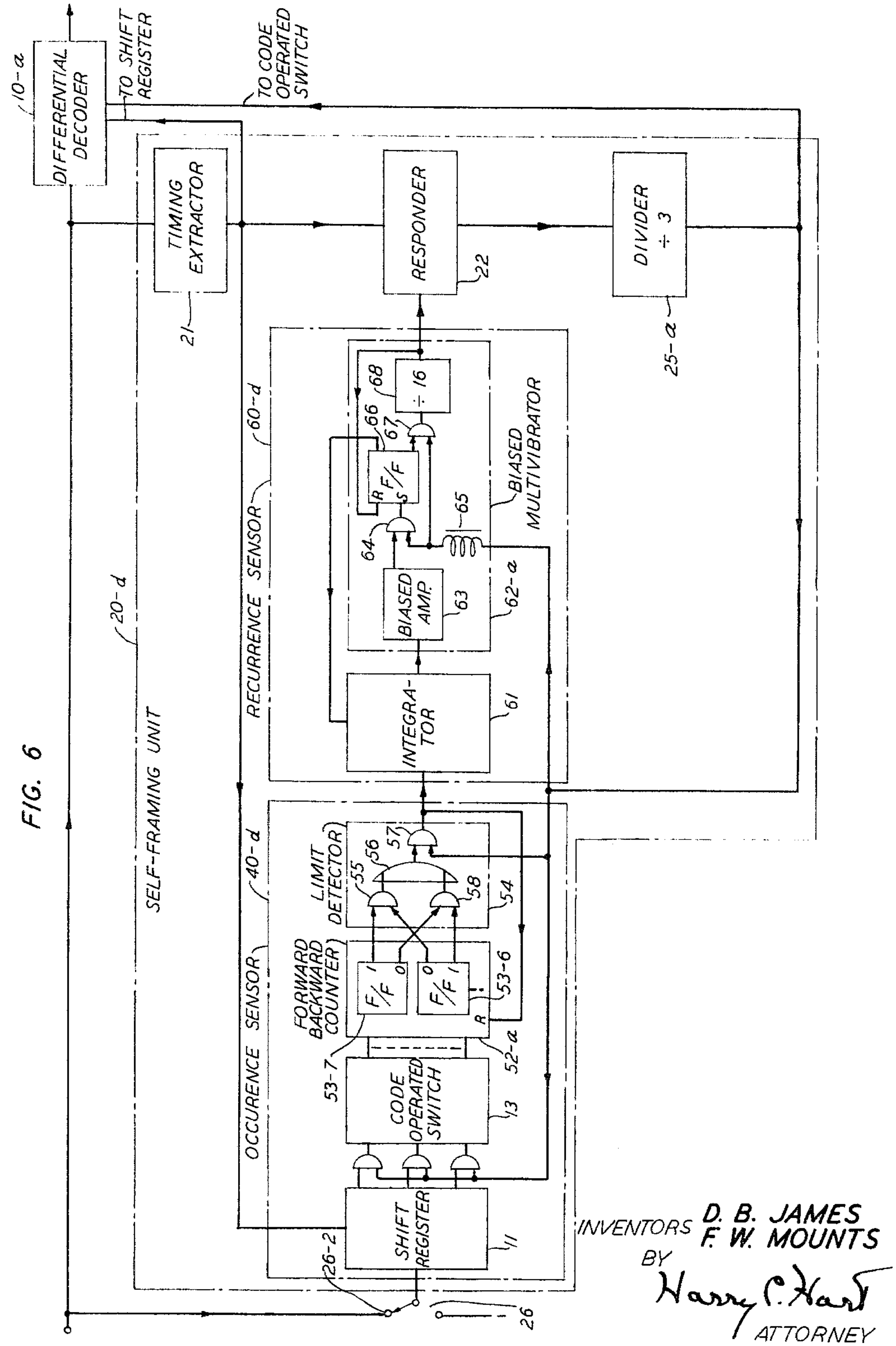
FIG. 6 is a block diagram of a self-framing decoder system that permits separation of the decoder and its self-framing unit.

A variation of the self-framing system of FIG. 5 is shown in FIG. 6. In the latter figure the code signals are obtained before entry into the decoder 10–*a*. This permits a separation of the decoder unit 10–*a* proper from its self-framing unit 20–*d*, as may be desirable where message waves are to be multiplexed. Accordingly, the selector switch 26 is set to its second position 26–2. Included in the occurrence sensor 40–*d* are a shift register 11 and a code operated switch 13, which activate a forward-backward counter 52–*a* in the same way that the comparable shift register and code operated stages 11 and 13 activate the counter 52 of FIG. 5.

In one form of counter 52–*a*, where the incoming signal does not exceed 63 units, seven flip flops 53, of which the sixth and seventh flip flops 53–6 and 53–7 are indicated, are energized by the code operated switch 13. At equilibrium the direct and complementary leads of the seventh flip flop 53–7 present a "one" and a "zero," respectively. Comparable leads of the sixth flip flop 53–6 store alternate levels.

When the stored count changes by 64 units in either direction, the limit detector 54 is operated. For example, a change of 64 units in the positive direction causes the sixth flip flop 53–6 to interchange its signal states, producing a "one" on its direct lead connected to the first AND gate 55 of the limit detector 54. Because of the "one" supplied on the other lead of the AND gate 55 by the seventh flip flop 53–7, an output is passed by the detector OR gate 56 to a second AND gate 57. There, a signal from the divider 25–*a* allows the error indication to pass into the recurrence sensor 60–*d*. A similar sequence occurs if the count changes by 64 units in the negative direction. Then the complementary leads from the sixth and seventh flip flops 53–6 and 53–7 present "ones" and activate the alternate AND gate 58 of the limit detector. In either case the ensuing behavior of the recurrence sensor 60–*d* is akin to that previously described in conjunction with FIG. 5.

Following the integrator 61 in the recurrence sensor 60–*d* is a biased multivibrator 62–*a*, whose operation is comparable to that of FIG. 4. When the threshold level of its biased amplifier 63 is exceeded, a level appears at the first multivibrator AND gate 64. Upon joinder by a delayed marker signal, derived from the divider network 25–*a* by way of a delay line 65, the threshold level at the AND gate 64 sets a flip flop 66. Besides clamping the recurrence integrator 61 in the same way that the flip flop 49 of FIG. 4 clamped the decoder integrator 18–*b*, the flip flop 66 provides a level to the second multivibrator AND gate 67. This, in turn, allows marker signals to enter a divider 68 that serves as a time-out circuit for a predetermined number of marker signal intervals. The ensuing disablement of the multivibrator 62–*a* is comparable to the effect achieved by selecting, in the recurrence sensor 60–*a* of FIG. 2, the integrator time constant and the pulse interval according to Equation 4. After a convenient count of the divider 68, such as 16, a control signal is applied both to a responder 22 and to a resetting terminal of the flip flop 66. Subsequent control signals are generated until the system of FIG. 6 is correctly framed.

Although the code signals considered in the various embodiments have been derived from a single source, the self-framing principle of the invention can be applied to multiplexed signals as well. In that case self-framing on a common channel is required with respect to only one of the multiplexed code messages.

Additionally, related adaptations of the invention, including numerous kinds of error detectors, special codes, digital and analog processings of encoded signals to activate the detector, will occur to those skilled in the art. Also apparent will be numerous occurrence and recurrence sensors which accomplish the positive identification of code words that are transmitted without identifying or framing signals. Furthermore, while the invention has been described in terms of discrete code elements, it is to be appreciated that coding applies to any translation of information to prescribed patterns and the invention may be turned to account in decoding generally.

What is claimed is:

1. Apparatus for recovering a message wave from incoming code signals, which comprises
   means for grouping said incoming code signals,
   means connected to the grouping means, for decoding the code signals thus grouped to derive amplitude samples of said wave,
   means, connected to the decoding means, for detecting occurrences of said amplitude samples exceeding a prescribed amplitude level,
   and means, interconnecting the detecting means with said decoding means and responsive to a prescribed rate of said occurrences, for regrouping said incoming code signals.

2. Apparatus for recovering a message wave from incoming code signals, groups of which represent a parameter of restricted value of said wave, comprising
   means for grouping said incoming code signals,
   means, connected to the grouping means, for decoding the incoming signals thus grouped, to derive message constituents of said wave,
   means, connected to the decoding means, for detecting in said message constituents, occurrences of said parameter exceeding said restricted value,
   and means, interconnecting the detecting means with said grouping means and responsive to the occurrence of a preassigned incidence of the detected occurrences, for regrouping said incoming pulse signals.

3. Apparatus for recoving a message wave from incoming signals, groups of which represent a specified message parameter of said wave, comprising
   means for grouping said incoming signals,
   means for detecting, for the signals thus grouped, the occurrences of departures of said message parameter from preassigned values thereof,
   and means responsive to a preassigned rate of said departures for regrouping said signals.

4. Apparatus for reconstituting a message wave which has been converted into groups of pulse signals and transmitted as a sequential pulse train with each group of pulse signals representing a preassigned parameter of the message wave, which parameter has permissible and impermissible values, comprising
   means for grouping the signals of said pulse train into pulse code groups,
   means for decoding said groups to recover signals representing various values of said parameter,
   means for testing the recovered signals for impermissible parameter values,
   and means for regrouping the signals of said pulse train for the occurrence of a prescribed incidence of said impermissible parameter values.

5. In apparatus for decoding the same message code signals at a decoder as are generated per frame with a known statistical pattern at an encoder, self-framing means comprising
   means for indicating the successive time-scale positions of incoming code signals,
   means, interconnecting the indicating means with said decoder, for controlling the grouping of message code signals in said decoder according to the number of time-scale positions occupying a nominal framing interval,
   means, connected to said decoder and responsive to the output thereof, for sensing the occurrence of departures from said known statistical pattern of said incoming message code signals collectively occupying each nominal framing interval,
   means, connected to the occurrence sensing means, for sensing the recurrence rate of said departures and for developing a control signal when said recurrence rate exceeds a prescribed threshold indicating that said decoder is out of frame,
   and means, interconnecting the recurrence sensing means with the grouping control means and responsive to said control signal, for recurrently modifying the groupings of said message code signals within said framing interval, whereby said message code signals are correctly framed when said recurrence rate falls below said prescribed threshold.

6. In receiver apparatus for reconstituting a message wave of restricted maximum amplitude from incoming groups of two valued pulse signals developed at a transmitter station, each group normally representing a quantized increment of said wave,
   said apparatus requiring, for correct message reconstitution, a particular phase relation between its operations and operations conducted at said transmitter station, and said aparatus including
      (1) means for at least partially decoding incoming code groups to derive signals provisionally representative of message wave increments, and
      (2) means for integrating the derived signals to obtain signal levels provisionally representative of message wave amplitudes, at least some of said signal levels exceeding a limit level representative of said restricted maximum amplitude for all phase relations other than said particular phase relation,
   means for recovering said particular phase relation, when lost, which comprises
      a device connected to the integrating means and having a threshold of operation in excess of said limit level for developing, when operated, a control signal,
   and means interconnecting said device with the decoding means and responsive to said control signal for altering the existing phase of the operations of said receiver apparatus until said particular phase relation is recovered.

7. Apparatus as defined in claim 6 wherein said device comprises a biased multivibrator which simultaneously generates said control signal and a signal for clamping said integrating means, whereby an occasional derived signal exceeding said limit level is prevented from spuriously altering said existing phase of the operations of said receiver apparatus.

8. In a system for reconstituting, from an incoming train of code elements, a message wave of unknown content but of known characteristic, consecutive groups of said code elements, nominally constituting consecutive code words and hence being representative, according to a preassigned code, of consecutive values of a preassigned parameter of a message wave, one of said parameter values having a known parameter of incidence,
   the system operating with one of a plurality of discrete, different phase relations between code words and groups of said code elements, only one of which leads to correct reconstitution,
   means for recovering said correct phase relation when once lost, which comprises means for grouping said incoming code elements and for determining, from the code elements thus grouped, incidences of said groups that represent said parameter value, means connected to the grouping means for comparing the pattern of said last named incidences with the known incidence pattern of said parameter values as it occurs in said message wave, and means connected to the comparing means and responsive to a wide disparity of said determined pattern and the pattern for altering the phase relation presently obtaining between code words and code element groups.

9. Apparatus for processing sequential code signals derived from a message wave having a known statistical pattern which comprises means for provisionally grouping said code signals, means, connected to the grouping means, for evaluating the provisionally grouped signals collectively for the known statistical pattern of said wave, means, connected to the evaluating means, for generating a control signal indicating the absence of said known statistical pattern from said wave, and means, interconnecting the generating means with said grouping means and responsive to said control signal, for regrouping said provisionally grouped signals to produce said known statistical pattern in said wave.

10. Apparatus for reconstituting a message wave from its encoder counterpart, the message wave being characterized by a restricted maximum amplitude, the encoded counterpart being characterized by sequential pulse signal groups that are individually representative, according to a preassigned code of the latest increments between consecutive amplitude samples of the message wave, which apparatus comprises means for decoding successive groups of incoming pulse signals conditionally representative of successive wave increments, means, connected to the decoding means, for accumulating the wave increments to develop message wave samples conditionally representative of the reconstituted message wave, comprising a device, connected to the accumulating means, having an input threshold of operation at a level in excess of the restricted maximum message wave amplitude and proportioned to deliver a control signal when said threshold is exceeded, and means, interconnecting said device with said decoding means and responsive to said control signal when it occurs, for altering the grouping of said incoming pulse signals by said decoding means.

11. Apparatus for reconstituting a message wave from incoming two-valued pulse signals developed at a transmitter station which comprises an input point to which said signals are applied, means connected to said input point for grouping said pulse signals into code words, and means connected to the grouping means and responsive thereto, for translating said code words into various levels according to a code having odd symmetry about a zero level for the first signal of each group and even symmetry for the remaining signals of each group.

12. Apparatus as defined in claim 11, wherein the translating means includes means, connected to said grouping means, for converting each group of binary signals into an output on one of an even plurality of terminals, and means connected to each half of said terminals for weighting the outputs thereon in inverse ratios of successive powers, except for the first power, of the binary base number 2.

13. Apparatus as defined in claim 12 wherein the weighting means comprises means for weighting said outputs in inverse ratios of $2^{n+1}:2^n:2^{n-1}: \ldots 2^2:2^0$, where $n$ is the number of binary signals in each group thereof.

14. A self-synchronizing decoder system which comprises an input point to which incoming signals are applied, a decorder comprising a shift register connected to said input point, a code-operated switch connected to said shift register, a weighting network connected to said code operated switch, and an integrator connected to said weighting network, and a self-framing unit compising a full-wave rectifier connected to the integrator of said decoder, a first biased-multivibrator constituted of a limit switch connected to said full wave rectifier, a pulse source, and a sensor switch having a control terminal connected to said limit switch, an input terminal connected to said pulse source and an output terminal, a second integrator which is connected to the output terminal of said sensor switch, a second biased-multivibrator, similar to the first, connected to said second integrator, a timing extractor interconnecting said input point with the shift register of said decoder, a responder having a first input connected to said timing extractor and a second input connected to the said second biased-multivibrator, and a divider interconnecting said responder with said code operated switch.

15. A self-framing decoder system for differential pulse code signals which comprises a differential signal decoder having an input, an output, a shift register control terminal, a switch control terminal and an integrator control terminal, a timing extractor interconnecting the input of said differential decoder with said shift register control terminal, an error detector constituted of a biased amplifier connected to the output of said differential decoder, an AND gate activated jointly by said biased amplifier and said timing extractor, a delay line connected to said AND gate, a flip-flop having a reset terminal, a set terminal connected to said delay line and an output terminal connected to said integrator control terminal, an OR gate activated by said timing extractor and from said delay line, and a divider interconnecting said OR gate with said reset terminal and the switch control terminal of said differential decoder.

16. A self-framing decoder system comprising a differential decoder having an input, an intermediate output, a switch control terminal, and a shift register control terminal, a forward-backward counter activated from the intermediate output of said differential decoder, said counter having an output and being resettable therefrom, a recurrence sensor connected to the output of said counter, a timing extractor interconnecting the input of said decoder, with the shift register control terminal thereof, a responder jointly activated by said timing extractor and said recurrence sensor, and a divider interconnecting said responder with the switch control terminal of said decoder.

References Cited by the Examiner

UNITED STATES PATENTS

| | | | |
|---|---|---|---|
| 2,949,503 | 8/1960 | Andrews et al. | 179—15 |
| 2,957,945 | 10/1960 | Packard | 179—15 |
| 3,065,302 | 11/1962 | Kaneko | 179—15 |
| 3,065,303 | 11/1962 | Kaneko | 179—15 |
| 3,065,304 | 11/1962 | Dawson | 179—15 |
| 3,069,504 | 12/1962 | Kaneko | 179—15 |
| 3,087,996 | 4/1963 | Kaneko | 179—15 |

DAVID G. REDINBAUGH, *Primary Examiner.*

L. MILLER ANDRUS, *Examiner.*